US011900012B2

(12) United States Patent
Eubank et al.

(10) Patent No.: US 11,900,012 B2
(45) Date of Patent: Feb. 13, 2024

(54) METHOD AND SYSTEM FOR SEAMLESS MEDIA SYNCHRONIZATION AND HANDOFF

(71) Applicant: Apple Inc., Cupertino, CA (US)

(72) Inventors: Christopher T. Eubank, Mountain View, CA (US); Tomlinson Holman, Palm Springs, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 17/242,080

(22) Filed: Apr. 27, 2021

(65) Prior Publication Data
US 2022/0091812 A1  Mar. 24, 2022

Related U.S. Application Data

(60) Provisional application No. 63/082,896, filed on Sep. 24, 2020.

(51) Int. Cl.
*G06F 3/16* (2006.01)
*G11B 20/00* (2006.01)

(52) U.S. Cl.
CPC ........ *G06F 3/165* (2013.01); *G11B 20/00086* (2013.01)

(58) Field of Classification Search
CPC . G06F 3/165; G11B 20/00086; G11B 27/102; G11B 27/28; H04R 3/12;
(Continued)

(56) References Cited

U.S. PATENT DOCUMENTS

| 7,668,964 B2 | 2/2010 | Millington |
| 7,983,614 B2 | 7/2011 | Dunko |

(Continued)

FOREIGN PATENT DOCUMENTS

| EP | 2477104 | 7/2012 |
| EP | 2618247 | 7/2013 |

(Continued)

OTHER PUBLICATIONS

"FM Translators Get Their Own RDS Codes," National Radio Systems Committee, Nov. 29, 2017, 2 pages.

(Continued)

*Primary Examiner* — Andrew Sasinowski
(74) *Attorney, Agent, or Firm* — Aikin & Gallant, LLP (57) ABSTRACT

A method performed by a portable media player device. The method receives a microphone signal that includes audio content output by an audio playback device via a loudspeaker. The method determines identification information regarding the audio content, wherein the identification information is determined through an acoustic signal analysis of the microphone signal. In response to determining that the audio playback device has ceased outputting the audio content, the method retrieves from local memory of the portable media player device or a remote device with which the portable media player device is communicatively coupled, an audio signal that corresponds to the audio content and drives a speaker that is not part of the audio playback device using the audio signal to continue outputting the audio content and any additional audio content related to the audio content.

26 Claims, 5 Drawing Sheets

(58) Field of Classification Search
CPC ........ H04H 60/80; H04H 60/40; H04H 60/82; H04H 60/88; H04H 60/90
See application file for complete search history.

(56) References Cited

U.S. PATENT DOCUMENTS

| | | | |
|---|---|---|---|
| 8,239,559 | B2 | 8/2012 | Rajapakse |
| 8,311,967 | B1 | 11/2012 | Lin et al. |
| 8,559,931 | B2 | 10/2013 | Moon et al. |
| 9,529,500 | B1 | 12/2016 | Gauci et al. |
| 10,331,399 | B2 | 6/2019 | Alsina et al. |
| 2007/0061735 | A1 | 3/2007 | Hoffberg et al. |
| 2008/0167923 | A1 | 7/2008 | Chowdhary et al. |
| 2010/0306705 | A1 | 12/2010 | Nilsson |
| 2010/0318576 | A1 | 12/2010 | Kim |
| 2011/0035693 | A1 | 2/2011 | Ueno et al. |
| 2011/0055758 | A1 | 3/2011 | Lukasiak et al. |
| 2011/0119628 | A1 | 5/2011 | Carter et al. |
| 2012/0115453 | A1 | 5/2012 | Zheng |
| 2012/0202424 | A1 | 8/2012 | Kim |
| 2012/0259439 | A1 | 10/2012 | Li |
| 2013/0290347 | A1 | 10/2013 | Saib |
| 2014/0032678 | A1 | 1/2014 | Koukoumidis et al. |
| 2014/0101472 | A1 | 4/2014 | Rohrweck |
| 2014/0123022 | A1 | 5/2014 | Lee et al. |
| 2014/0274185 | A1 | 9/2014 | Luna et al. |
| 2014/0354441 | A1 | 12/2014 | Luna |
| 2015/0082242 | A1 | 3/2015 | Antipa |
| 2015/0088422 | A1 | 3/2015 | Nikovski et al. |
| 2015/0088662 | A1 | 3/2015 | Noller et al. |
| 2016/0357509 | A1 | 12/2016 | Alsina et al. |
| 2016/0357774 | A1 | 12/2016 | Gauci et al. |
| 2017/0076208 | A1 | 3/2017 | Huang et al. |
| 2017/0293507 | A1 | 10/2017 | Liu et al. |
| 2018/0183881 | A1 | 6/2018 | Lewis et al. |
| 2018/0249250 | A1* | 8/2018 | Pate ........................ G06F 3/165 |
| 2019/0317721 | A1* | 10/2019 | Sheen ................... G06F 3/0488 |
| 2020/0097248 | A1* | 3/2020 | Wood ................... G06F 3/0486 |
| 2021/0014613 | A1* | 1/2021 | Carrigan ................ G06F 3/167 |

FOREIGN PATENT DOCUMENTS

| | | |
|---|---|---|
| EP | 2786889 | 10/2014 |
| JP | 2004-152276 | 5/2004 |
| JP | 2010-130669 | 6/2010 |
| KR | 10-2012-0082371 | 7/2012 |
| KR | 10-2015-0001871 | 1/2015 |
| WO | 2009072196 | 6/2009 |

OTHER PUBLICATIONS

"Resume playing on different device," The Spotify Community, Mar. 4, 2012, 8 pages.

Zibreg, Christian, "PlayOff enables Apple Music continuity playback between your Mac and iPhone," Mar. 5, 2019, 10 pages.

Yan, Tingxin, et al., "Fast App Launching for Mobile Devices Using Predictive User Context," MobiSys '12, Jun. 25-29, 2021, ACM 978-1-4503-13-1, Aug. 12, 2006, 14 pages.

Brandao, G., "Headphone Connect," Google Play App, Sep. 5, 2014, 4 pages.

"When Using a Tasker, get on a car How to start music from Android terminal automatically," MacWin, Ver. 0.7, Jan. 29, 2011, 6 pages.

Baladad, Mike, "How to Auto Start Your Favorite Music Player When Plugging Headphones into a Galaxy S4," Nov. 28, 2013, 16 pages.

Hoffman, Chris, "How to Use Tasker to Automate Your Android Phone," Aug. 21, 2013, 10 pages.

Baladad, Mike, "How to Auto-Start Your Favorite Music Player When Plugging Headphones into a Galaxy S4," Dec. 31, 2014, 14 pages.

Parziale, Carl, "Bluetooth Connect and Play-Android Apps on Google Play," Mar. 14, 2015, 5 pages.

"Auto play music on bluetooth?" Jun. 7, 2021, 6 pages.

Maobipes, Comment posted on article "How to stop the music app from auto-playing in your car," May 8, 2015, 1 page.

* cited by examiner

METHOD AND SYSTEM FOR SEAMLESS MEDIA SYNCHRONIZATION AND HANDOFF

CROSS-REFERENCE TO RELATED APPLICATION

This application claims the benefit of and priority of U.S. Provisional Patent Application Ser. No. 63/082,896, filed Sep. 24, 2020, which is hereby incorporated by this reference in its entirety.

FIELD

An aspect of the disclosure relates to seamlessly synchronizing and handing off audio playback by an audio system to another audio output device. Other aspects are also described.

BACKGROUND

With the proliferation of wireless multimedia devices, people are able to stream multimedia content from practically anywhere. For example, these devices provide access to music streaming platforms that allow users to stream music for free. As a result, people are consuming much more media content than ever before. For instance, on average people are spending approximately thirty hours a week listening to music.

SUMMARY

An aspect of the disclosure is a method performed by an electronic device (e.g., a portable media player device, such as a smart phone), which receives a microphone signal from a microphone of the electronic device. The microphone signal includes audio content output by an audio system (or audio playback device) via a loudspeaker that is arranged to project sound into an ambient environment in which the electronic device is located. In one aspect, the audio system may be (or include) a (e.g., standalone) radio that is playing a radio broadcasting program. For example, the audio system may be a part of a vehicle audio system of a vehicle, which itself may include a radio. In some aspects, the electronic device may not be a part of an ecosystem that includes the audio system. Specifically, the electronic device may not be configured to receive data (such as metadata) from the audio system that describes or identifies the audio content that is being output by the audio system. For instance, the electronic device may not be communicatively coupled with the audio system. Instead, the electronic device determines identification information of the audio content, where the identification information was determined through an acoustic signal analysis of the microphone signal. For instance, the analysis may include an audio recognition algorithm that is configured to identify the audio content (e.g., when the audio content is a musical composition, the recognition algorithm may identify the title and/or artist of the composition). The electronic device determines that the audio system has ceased outputting the audio content. For instance, the device may determine that a sound output level of the loudspeaker is below a threshold (e.g., indicating that the audio system has been switched off). In response to determining that the audio system has ceased outputting the audio content, the device retrieves, from local memory or from a remote device with which the electronic device is communicatively coupled, an audio signal that corresponds to the audio content and drives a speaker that is not part of the audio system using the audio signal to continue outputting the audio content.

In one aspect, the audio playback handoff may be synchronized such that the electronic device continues to output the audio content from when the audio system left off. Specifically, the audio content may have a playback duration (e.g., a three-minute musical composition). The audio system may cease to output the (first) musical composition at a moment (e.g., a playback stop time) within the playback duration, such as at the one-minute mark. In this case, the retrieved audio signal may be a remainder of the musical composition that begins at or after the one-minute mark. In some aspects, a fade-in audio transition effect may be applied upon a beginning portion of the audio signal in order to provide a smooth transition.

In one aspect, the electronic device may stream a playlist once the audio content has been output (or played back) by the speaker. Specifically, the electronic device may stream each of several musical compositions of a playlist in a consecutive order (e.g., streaming one musical composition after another), once the remainder of the first musical composition is output via the speaker. Each of the musical compositions of the playlist may be related to the first musical composition. For instance, each composition of the playlist may be at least one of a same genre, a same musical artist, or belonging to a same album as the first musical composition.

As described herein, the audio system may be a part of a vehicle audio system. In one aspect, determining that the audio system has ceased outputting audio content includes determining at least one of the vehicle has stopped or an engine of the vehicle has been shut off. In another aspect, the electronic device receives image data from a camera. Determining that the vehicle has stopped or that the engine has been shut off includes performing an object recognition algorithm upon the image data to detect an object that indicates at least one of the vehicle being stopped or the engine being shut off. For example, the electronic device may detect that an object, such as a tree has remained in the field of view of the camera for an extended period of time (e.g., one minute), indicating that the vehicle has stopped.

As described herein, the audio content may be a radio broadcasting program that is playing (or being played) by a radio. In one aspect, the electronic device may stream the radio broadcasting program upon determining that the audio system has ceased outputting the program. For instance, the electronic device may process the microphone signal according to a speech recognition algorithm to detect speech contained therein, and determine that the output audio content is a radio broadcast program based on the speech. For instance, the device may determine that the audio content is a radio broadcast program based on the speech including a radio station call sign. In addition, the device may determine the specific radio broadcasting station that is associated with the call sign. For instance, the device may receive location information (e.g., global positioning satellite (GPS) data) of the electronic device that indicates a current location of the device. The device may identify the specific radio broadcasting station that is broadcasting the radio broadcast program based on the radio station call sign and the location information. The device may continue outputting the audio content by streaming the radio broadcast program that is being broadcast by the radio broadcasting station over a computer network (e.g., using streaming data that is associated with the radio program).

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

A person may experience media content, such as audio content (e.g., music or musical composition(s)) across different electronic devices throughout a day. For example, while working a person may listen to music on a desktop computer via a music streaming platform. At the end of the day, the person may pack their things and continue to listen to the music on a multimedia device (e.g., smart phone) via the same music streaming platform. In some instances, the user may transition to the multimedia device in the middle of a song (e.g., at a moment during a playback duration of the audio content). Once streaming content on the multimedia device, the music streaming platform may begin a different song or the song that was played on the desktop computer may continue playing on the multimedia device. In this case, the song may continue because the streaming platform keeps track of a playback position and both user devices are connected to the platform via a same user account. Thus, when the user transitions to the multimedia device, the platform may transmit the playback position to the multimedia device to allow the user to continue streaming the content.

Although the music streaming platform may provide a transition between two devices, this method is only possible because both devices are a part of a same ecosystem. Specifically, both devices are associated with a same user account via the same streaming platform. In other situations, where devices are not a part of the same ecosystem, however, such a transition may not be possible. For example, during a morning (and evening) commute to (and from) work, a person may listen to music via a car radio. The person may tune the car radio to a particular radio station that plays (or broadcasts) a particular type of music, such as country music. Once the person arrives at their destination, the person parks and shuts off the car, which may result in deactivating all (or most) of the vehicle electronics, including the radio. As a result, the radio may abruptly shut off in the middle of a song that the person would otherwise want to hear. To finish the song, the person may search for the song on a multimedia device and manually play the song. For instance, the song may be stored in memory on the device, or the person may search for the song on a streaming platform. Doing this, however, would start the song from the beginning, which may not be preferable since the person may want to just finish the song from where the radio left off. The person may have to manually fast forward through the song to reach that part of the song. Thus, unlike the previous example, the multimedia device is unable to provide a seamless transition when the radio is shut off, since both devices are not a part of the same ecosystem. Therefore, there is a need for seamlessly handing off media playback from one device to another electronic device to continue audio output.

The present disclosure describes an audio system that includes an electronic device for seamless media synchronization and handoff to an electronic device, which is not a part of (e.g., communicatively coupled to) a playback device that is outputting the media.

Figure 1:
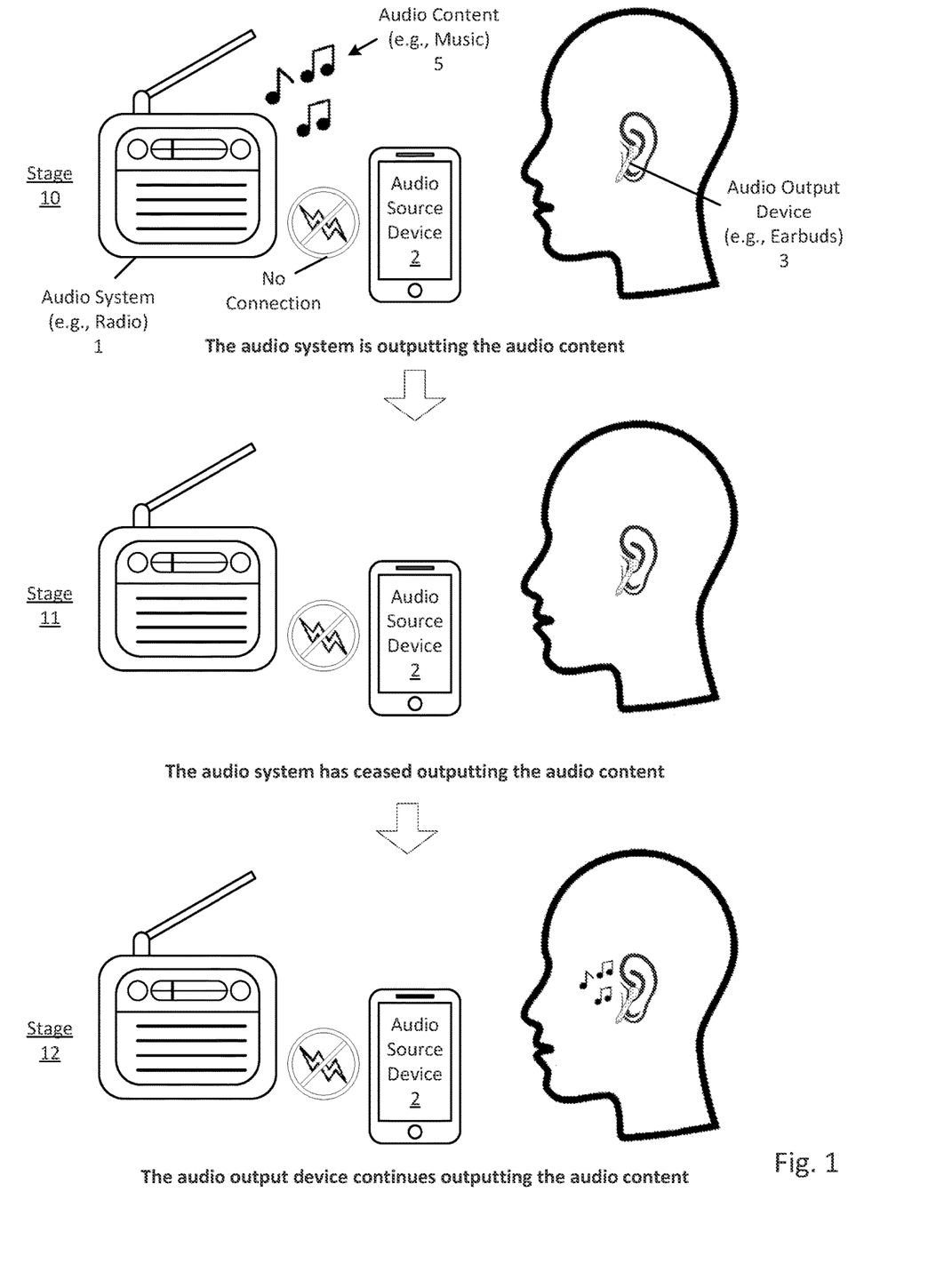
FIG. 1 shows several stages of seamlessly synchronizing and handing off audio content to another device in order to continue output of audio content according to one aspect.

FIG. 1 shows several stages of seamlessly synchronizing and handing off audio content to another device in order to continue output of audio content according to one aspect. Specifically, this figure illustrates three stages 10-12 in which audio content is seamlessly handed off to an electronic device in order to continue output of the content. Each stage includes an audio system (or a playback device) 1, an audio source device 2, and an audio output device 3. In one aspect, the audio source device and the audio output device may be a part of a (e.g., second) audio system that is configured to perform audio signal processing operations to seamlessly synchronize and handoff audio content playback, such as audio system 20 of FIGS. 2 and 3 as described herein. More about this audio system is described herein.

In one aspect, the audio system 1 is illustrated as a (e.g., standalone) radio. In one aspect, the audio system 1 may be (e.g., a part of) any system (or electronic device) that is configured to output audio content. For example, the audio system may be a part of a vehicle audio system of a vehicle. Other examples may include being (e.g., a part of) at least one of a stand-alone speaker, a smart speaker, a home theater system, a tablet computer, a laptop, a desktop computer, etc.

The audio source device 2 is illustrated as a portable media player (or multimedia) device, more specifically a smart phone. In one aspect, the source device may be any electronic device that can perform audio signal processing operations and/or networking operations. An example of such a device may include any of the electronic devices described herein, such as a laptop, a desktop computer, etc. In one aspect, the source device may be a portable device, such as a smart phone as illustrated. In another aspect, the source device may be a head-worn device, such as smart glasses, or a wearable device, such as a smart watch.

The audio output device 3 is in-ear headphones (earphones or earbuds) that that are arranged to direct sound into the ears of the wearer. Although only illustrating the left earbud, the audio output device may also include a right earbud, both of which are configured to output (e.g., stereo) audio content. In one aspect, the output device may be any electronic device that includes at least one speaker that is arranged to output sound by driving the speaker with at least one audio signal. In another aspect, the output device may be any electronic (e.g., head-worn) device (e.g., headset) that is arranged to be worn by the user (e.g. on the user's head), such as the earbuds illustrated herein. Other examples of a head-worn device may include on-ear headphones and over-the-ear headphones.

In one aspect, the audio source device 2 may be communicatively coupled to the audio output device 3, via a wireless connection. For instance, the source device may be configured to establish a wireless connection with the output device via any wireless communication protocol (e.g., BLUETOOTH protocol). During the established connection, the source device may exchange (e.g., transmit and receive) data packets (e.g., Internet Protocol (IP) packets) with the output device, which may include audio digital data. In another aspect, the source device may be coupled via a wired connection. In one aspect, the audio output device may be a part of (or integrated into) the audio source device. For example, both devices may be one integrated electronic device. Thus, at least some of the components (e.g., at least one processor, memory, at least one speaker, etc.) of the audio output device may be a part of the audio source device. As described herein, at least some (or all) of the synchronization and hand off operations may be performed by the audio source device 2 and/or the audio output device.

Conversely, however, the audio source device 2 (and/or the audio output device 3) is not communicatively coupled to the audio system 1 (illustrated as not being connected to one another). Specifically, the audio system may be a part of a "device ecosystem" in which devices within (or belonging) to the ecosystem may be configured to communicatively couple (or connect) with one another in order to exchange data. The audio source device 2 may be a non-ecosystem device with respect to the audio system 1, since the source device is not communicatively coupled to exchange data. In one aspect, the audio system may be the only system (or device) that is a part of this ecosystem. For instance, the radio illustrated in this figure may be a simple (or non-smart) device that is only configured to receive audio content as radio waves for output through one or more loudspeakers. Thus, the source device may be unable to couple to the audio system in order to exchange data since the audio system does not have the capabilities to (e.g., wirelessly) connect. In another aspect, the audio source device may not be communicatively coupled due to not being connected (e.g., having not been paired with the audio system), but would otherwise be able to connect. Thus, the source device may remain a non-ecosystem device until it is paired with the audio system (or with any device within the system's ecosystem).

In another aspect, the audio source device 2 may be able to connect with the audio system 1, but may still be a non-ecosystem device with respect to a user account. As described herein, the audio system 1 may be configured to stream audio content (e.g., music) via a multimedia streaming platform for which the user may have an associated user account. To stream content, the audio system may connect to (e.g., one or more remote servers of) the platform, and gain access to media content via a user account. In one aspect, the audio source device 2 may be a non-ecosystem device such that the device is not communicatively coupled with the platform to exchange data (e.g., via the same user account through which the audio system is connected). In one aspect, the audio source device may couple to the system (e.g., via a Universal Serial Bus (USB) connector), but may still not be a non-ecosystem device when both devices are not associated with the same user account. For instance, when the audio system is a vehicle audio system the audio source device may be coupled via a USB connector in order to charge the device.

Returning to FIG. 1, the first stage 10 illustrates that the audio system 1 is outputting audio content (e.g., music) 5 into the ambient environment, which includes the audio source device 2 and the user (e.g., who is wearing the audio output device 3). In particular, the audio system is outputting the audio content via one or more loudspeakers (not shown), each of which is arranged to project sound into the ambient environment in which the source device and/or the output device are located.

In one aspect, while (before or after) the audio system 1 is outputting the audio content, the audio source device 2 may be performing one or more audio signal processing operations to determine identification information of the audio content. For instance, the source device may be performing an acoustic signal analysis upon one or more microphone signals from one or more microphones (e.g., microphones 22 in FIG. 2) to determine identification information. Specifically, the audio source device may receive one or more microphone signals from microphone 22, where the signal includes audio content output by the audio system via a loud speaker, as described herein. The audio source device may determine identification information of the audio content, which is determined through an acoustic signal analysis of the microphone signal. For example, when the audio content is a musical composition, the analysis may determine a title of the composition, a playback duration of the composition, the musical artist performing the composition, a genre of the composition, etc. Thus, the audio source device may determine information regarding the audio content without receiving such data (e.g., as metadata received via a wired and/or wireless connection) from the audio system 1 that is playing back the audio. In addition, the source device may determine a current playback time of the audio content that is being output by the audio system. More about these operations are described herein.

At stage 11, the audio system 1 has ceased (stopped or paused) outputting the audio content 5. For instance, the radio may have been turned off by the user (e.g., the user switching a power switch to an off position). As another example, the user may have adjusted playback by manually pausing or stopping the audio content. Returning to the previous example, when the radio is a part of the vehicle audio system, the audio content may have ceased when an engine of the vehicle has been shut off. In one aspect, the source device may determine that the audio system has ceased outputting the audio content. For instance, the device may determine that a sound pressure level (SPL) of the microphone signal is below a SPL threshold. More about how it is determined that the audio content has ceased is described herein. In another aspect, the source device may determine a moment (or playback stop time) within the playback duration at which the musical composition has ceased.

At stage 12, the audio output device 3 is continuing to output the audio content. Specifically, in response to the audio source device determining that the audio system 1 has ceased outputting the audio content, the audio source device may be configured to retrieve the audio content (e.g., from local memory or from a remote device) as one or more audio signals, using the identification information, and drive a speaker using the audio signal(s) to continue outputting the audio content. In one aspect, the audio source device may use the audio signal to drive one or more speakers that are not part of the audio source device to continue outputting the audio content. For instance, the audio source device transmits, via the connection between the two devices, the retrieved audio signal to the audio output device in order to drive a speaker of the output device. In one aspect, the sound produced by (e.g., the speaker of) the audio output device may be synchronized with the output of the audio system 1. In particular, the retrieved audio content may be a remainder of the audio content that was being output by the audio system 1 (e.g., after the playback stop time). As a result, the audio output device may continue outputting the audio content as if to hand off audio output without (or with a momentary) pause in playback. Thus, the user is able to continue enjoying the audio content even after the audio system 1 has ceased playback.

Figure 2:
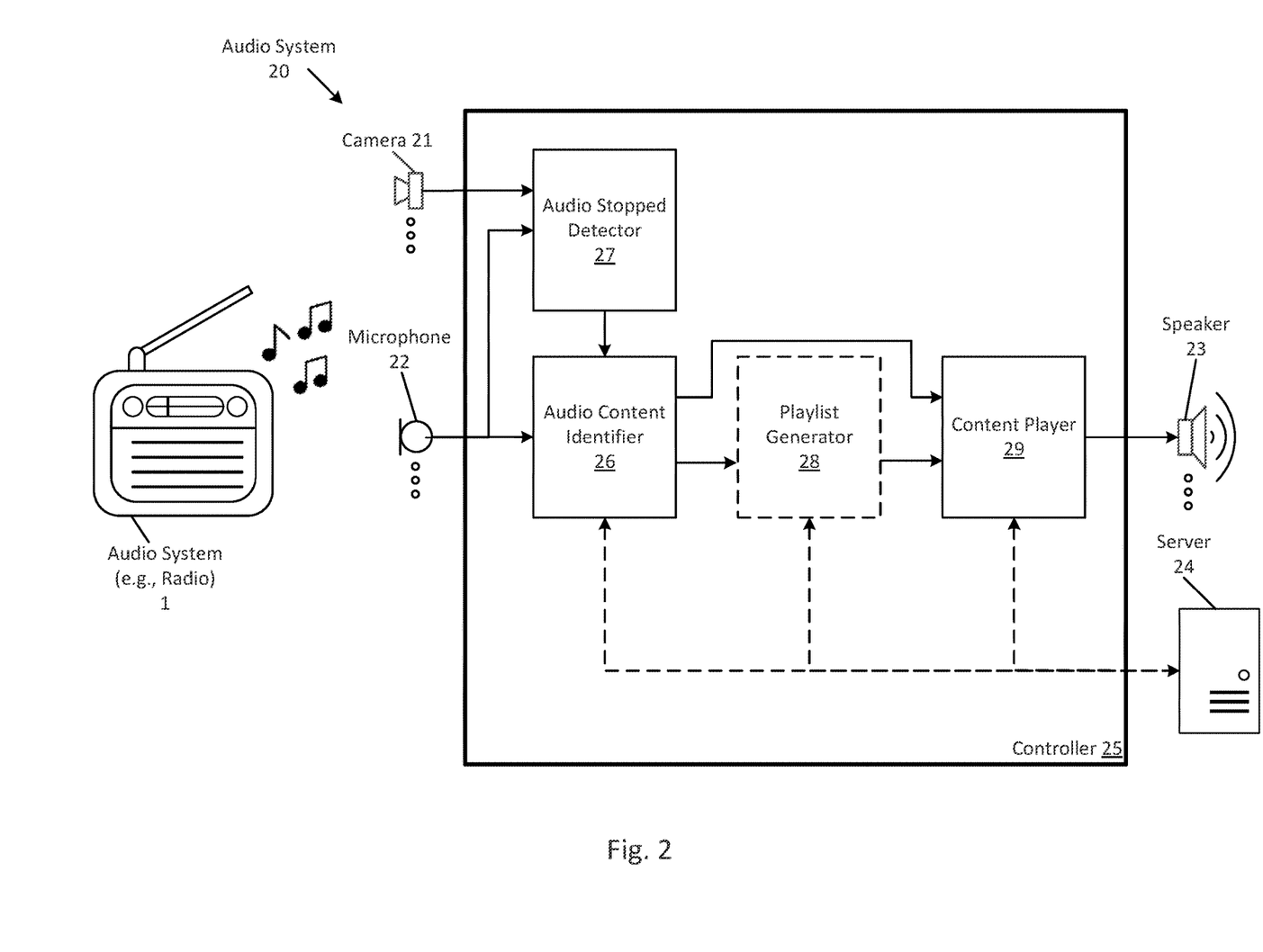
FIG. 2 shows a block diagram of an audio system that continues to output audio content according to one aspect.
Figure 3:
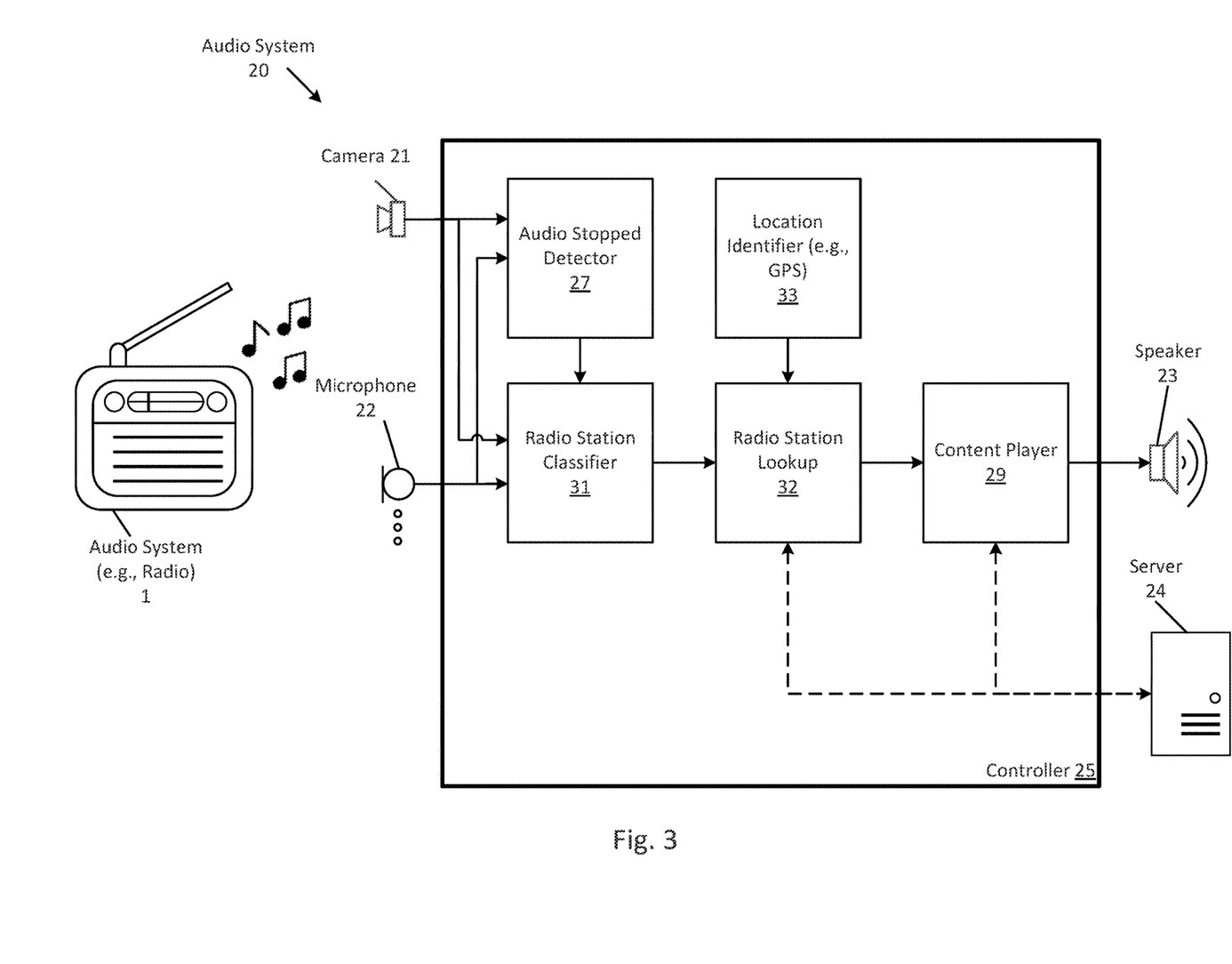
FIG. 3 shows a block diagram of the audio system that continues to output a radio broadcast program according to another aspect.

As described herein, FIGS. 2 and 3 show block diagrams of an audio system 20. In one aspect, both figures show block diagrams in which identification information of audio content that is being output by an audio playback device (e.g., which is not communicatively coupled via a wired and/or wireless (e.g., radio frequency (RF)) connection to the audio system 20) is determined through acoustic signal analysis of the audio content, and in response to (the audio system) determining that the audio playback device has ceased outputting the audio content, continuing to output the audio content via one or more speakers, where, for example, FIG. 2 describes continuing to output a remainder of the audio content (e.g., a remainder of a musical composition), and FIG. 3 describes continuing to output a radio broadcast program. More about the operations of these figures are described below.

In one aspect, the elements of the audio system 20 shown in FIGS. 2 and 3 and described herein that perform audio digital signal processing operations may be implemented (e.g., as software) as one or more programmed digital processors (generically referred to here as "a processor" that is to execute instructions stored in memory). For example, at least some of the operations described herein may be performed by a processor of the audio source device 2 and/or a processor of the audio output device 3. As another example, all of the operations may be performed by at least one processor of either device.

Turning now to FIG. 2, this figure shows a block diagram of an audio system 20 that continues to output audio content according to one aspect. Specifically, the system includes a camera 21, a microphone 22, a controller 25, a speaker 23, and a (remote) server 24. In one aspect, the system may include more or less elements (or components). For instance, the system may include at least one (e.g., touch-sensitive) display screen. As another example, the system may not include the server 24. In some aspects, the elements described herein may be a part of either (or both) of the audio source device 2 and the audio output device 3, which may be part of the audio system 20. For example, the camera, microphone, and controller may be a part of (e.g., integrated into) the source device (which may also include the display screen), while the speaker may be a part of the audio output device. In some aspects, the audio system 20 may include the audio source device 2, the audio output device 3, and/or the server 24, as described herein.

The microphone 22 is an "external" microphone that is arranged to capture (or sense) sound from the ambient environment as a microphone signal. The camera 21 is configured to generate image data (e.g., video and/or still images) that contain a scene of the ambient environment within a field of view of the camera. In one aspect, the camera may be a part of (e.g., integrated with) the audio source device and/or the audio output device. In another aspect, the camera may be a separate electronic device. The speaker 23 may be an electrodynamic driver that may be specifically designed for sound output at certain frequency bands, such as a woofer, tweeter, or midrange driver, for example. In one aspect, the speaker may be a "full-range" (or "full-band") electrodynamic driver that reproduces as much of an audible frequency range as possible. In one aspect, the speaker may be an "internal" speaker that is arranged to project sound into (or towards) the user's ear. For instance, as illustrated in FIG. 1, the audio output device 3 may include one or more speakers 23, which when the output device is inserted into the ear canal of the user's ear the speaker (or transducer) is arranged to project sound directly into the ear canal of the user's ear.

In one aspect, the audio system 20 may include one or more "extra-aural" speakers (e.g., as speakers 23) that may be arranged to project sound directly into the ambient environment. Specifically, the audio output device may include an array of (two or more) extra-aural speakers that are configured to project directional beam patterns of sound at locations within the environment, such as directing beams towards the user's ears. For instance, when the audio output device is a head-worn device such as smart glasses, the extra-aural speakers may project sound into the user's ears. Thus, the audio system may include a sound output beamformer (e.g., where the controller 25 is configured to perform beamformer operations) that is configured to receive one or more audio signals (e.g., an audio signal that contains the audio content as described herein) and is configured to produce speaker driver signals which when used to drive the extra-aural speakers, produces spatially selective sound output in the form of sound output beam patterns, each pattern containing at least a portion of the audio signal.

The (remote) server 24 may be any electronic device that is configured to communicatively couple to the controller 25 (e.g., via a computer network, such as the Internet), and is configured to perform one or more of the signal processing operations as described herein. For instance, the controller 25 may be coupled to the server via any network, such as a wirelessly local area network (WLAN), a wide area network (WAN), a cellular network, etc., such that the controller may exchange data (e.g., IP packets) with the server 24. More about the server is described herein.

The controller 25 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform seamless audio synchronization and handoff to one or more electronic devices of the audio system 20, as described herein. The controller includes several operational blocks, such as an audio content identifier 26, an audio stopped detector 27, a playlist generator 28, and a content player 29. A discussion of the operational blocks is as follows.

The audio content identifier 26 is configured to receive a microphone signal from the microphone 22 that includes audio content that is being output by an audio system 1. The identifier 26 is configured to determine (or identify) identification information of (or regarding) the audio content contained within the microphone signal. In one aspect, the identifier determines the information through an acoustic signal analysis of the microphone signal. Specifically, the identifier may process the microphone signal according to an audio (or sound) recognition algorithm to identify one or more audio patterns (e.g., spectral content) contained therein that are known to be associated with particular audio content. In one aspect, the algorithm compares (e.g., at least a portion of) spectral content with known (e.g., stored) spectral content. For instance, the algorithm may perform a table lookup using spectral content of the microphone signal into a data structure that associates spectral content with known audio content, or more specifically identification information regarding the audio content. In one aspect, the identification information may include characteristics of the audio content, such as a description (e.g., title, the type of audio content, etc.) of the audio content, an author of the audio content, and a playback duration of the audio content. For example, when the audio content is a musical composition, the identification information may include characteristics such as a title of the musical composition, the playback duration of the composition, the musical artist(s) of the composition, the genre of the composition, etc. Upon identifying known spectral content that matches the spectral content of the microphone signal, the algorithm selects the identification information that is associated with the match. In one aspect, the audio content identifier may use any known method for identifying audio content contained within a microphone signal, and determining associated identification information.

In one aspect, the audio content identifier 26 may perform the acoustic signal analysis by performing a speech recognition algorithm upon the microphone signal to detect speech (e.g., at least one word) contained therein. Similar to the previous process, the identifier may identify the audio content by comparing the speech to (stored) speech that is associated with known audio content. More about using a speech recognition algorithm is described herein.

In one aspect, the audio content identifier 26 is configured to determine (or identify) a current playback time (or moment) within a playback duration of the identified audio content. Specifically, the identifier determines (and stores) a timestamp of the current playback time. In one aspect, the timestamp may be a part of the determined identification information. For instance, the spectral content of the microphone signal used to perform the acoustic analysis may be associated with a particular moment during the playback duration. In another aspect, the timestamp may be a moment at which the identifier determines the identification information (and/or receives the microphone signal) with respect to a start time of the audio content. For example, the audio content identifier may determine a start time of the audio content based on the microphone signal. Specifically, the identifier analyzes the microphone signal to determine whether a SPL of the signal is below a threshold for a period of time (e.g., two seconds). In the case of musical compositions, the period of time may correspond to time between two tracks. The identifier may store this as an initial timestamp, and when configured to determine identification information may store a time delta (as the timestamp) from the initial timestamp to the current playback time.

In one aspect, the audio content identifier 26 may periodically perform the acoustic signal analysis (e.g., every ten seconds). For instance, once the analysis is performed to determine the audio content's identification information, the analysis may be periodically performed to update the timestamp and/or to determine whether the audio content has changed. By performing the analysis periodically, the audio system may preserve system resources (e.g., battery power from which the controller may draw power). In another aspect, the audio content identifier may constantly perform the acoustic signal analysis.

The audio stopped detector 27 is configured to detect whether the audio content that is being captured by the microphone 22 has stopped. Specifically, the detector determines whether the audio system 1 which is outputting the audio content has ceased outputting the audio content. In one aspect, the detector may determine that the audio system has ceased outputting the content by determining that a sound output level of the of the audio system is below a (predetermined) threshold. In particular, the detector determines whether a SPL of the microphone signal is below a SPL threshold. In some aspects, the determination may be based on whether the SPL is below the threshold for a period of time (e.g., four seconds).

In one aspect, the audio stopped detector 27 may detect whether the audio output has ceased based on image data captured by the camera 21. In particular, the detector may receive image data from the camera 21 and perform an object recognition algorithm upon the image data to detect an object contained therein that indicates the audio system has ceased (or will cease) outputting the audio content. For instance, the detector may detect an object that indicates the radio 1 is shut off, such as a dial or switch that is positioned in an off position. As another example, the detector may detect that a light (e.g., a back light for illuminating a tuner of the radio) is not lit, thereby indicating that the radio is not powered.

In another aspect, the detector may determine that the audio output has ceased (e.g., to be experienced by a user of the audio output device) based on not detecting an object within the field of view of the camera. For instance, upon detecting that the audio system 1 is not within the field of view of the camera (e.g., for a period of time), the detector may determine that the user of the audio output device is not experiencing the audio content. This may be the case when the camera is a part of the audio output device and the user walks away from the radio (e.g., and in a different room), for example.

As described herein, the audio system that is outputting the audio content may be a part of a vehicle audio system of a vehicle. In one aspect, the detector may determine that the vehicle audio system has ceased outputting audio content based on the status of the vehicle. For instance, the detector may determine that the vehicle has stopped and/or an engine of the vehicle has been shut off, each of which may indicate that the vehicle audio system has ceased outputting sound. The detector may determine these situations in various ways. For example, the detector may perform the object recognition algorithm upon image data captured by the camera 21 to detect one or more objects that indicate whether the vehicle is stopped (e.g., stationary and/or parked) and/or whether the engine is shut off. For example, the detector may determine that the vehicle has stopped by detecting 1) that the user is within the vehicle (based on a recognition of an inside of a vehicle) and 2) that an object outside the vehicle has stayed in a stationary position for a period of time, thereby indicating that the vehicle has stopped. As another example, the detector may determine based on the image data that dashboard lights, which are illuminated while the car engine is on, are no longer illuminated, which indicate that the car engine is off. As another example, the detector may determine whether the vehicle is stopped and the engine is off based on an absence of engine and/or road noise. For instance, the detector may obtain one or more microphone signals from microphone 22 that is configured to capture ambient sounds. The detector may apply an audio classification model upon the microphone signal to determine whether engine sounds and/or road noise is present. If not, it may be determined that the vehicle is stopped and the engine is shut off.

In one aspect, the detector may determine that the vehicle's engine is off by other methods. For instance, the detector may determine that the source device (and/or output device) is no longer in motion. For example, the detector may obtain location information (e.g., from the location identifier 33 illustrated in FIG. 3) that indicates the location of the device (such as GPS data), and determine that the device is no longer in motion based on little to no change to the location of the device (e.g., for at least a period of time). In another aspect, the motion may be based upon motion data (or Inertial Measurement Unit (IMU) data) obtained from one or more IMUs of the audio system (e.g., which may be integrated in either device of the system). As another example, the detector, or more specifically the controller, may be communicatively coupled to an on-board vehicle computer, which may inform the detector when the engine is on or off. As yet another example, the detector may determine that the vehicle has been shut off based whether a wireless connection (e.g., BLUETOOTH connection) with the vehicle audio system has been lost. In some aspects, the detector may use any method to determine whether the vehicle audio system has ceased outputting audio content.

The content player 29 is configured is to continue outputting the audio content through speaker 23 (e.g., in response to the controller 25 determining that the audio playback device has ceased outputting audio content). Specifically, the content player may be a media player algorithm (or software application) that is configured to retrieve an audio signal that corresponds to (or contains) the audio content, and drive the speaker 23 using the audio signal in order to output the audio content. In particular, the content player is configured to receive identification information of audio content from the audio content identifier 26, and is configured to retrieve the audio content based on the information. For instance, as described herein, the identification information may include characteristics of the audio content (e.g., title, author, etc.) The content player may perform a search (e.g., a search in local memory and/or on a remote device, such as the server 24) to retrieve the audio signal containing the audio content. Once retrieved, the player uses the audio signal to drive the speaker 23.

As described herein, the audio system 20 is configured to seamlessly synchronize and hand off audio content to continue output of the audio content. The process of these operations performed by the controller 25 will now be described. Specifically, the audio stopped detector 27 determines that the audio system (or device) 1 has ceased outputting audio content, as described herein. The detector informs the audio content identifier that the audio playback device is no longer outputting sound. In response, the audio content identifier determines a moment at which the audio content has ceased (e.g., to be output by the audio playback device) within the audio content's playback duration as a playback stop time. In one aspect, the identifier may determine the playback stop time by performing an acoustic signal analysis (e.g., identifying where a portion of the last received spectral content is located within the audio content's playback duration). In another aspect, the audio content identifier may determine the playback stop time as a time delta from the last time a timestamp for the audio content was determined to when the detector had informed the identifier that the audio content has ceased. The identifier may transmit the identification information of the audio content and the playback stop time to the content player 29. The content player uses the identification information and/or the playback stop time to retrieve the audio content (e.g., from local or remote memory) as an audio signal, and drives the speaker with the audio signal. In particular, the audio signal may include a remainder of the audio content that begins at or after the playback stop time (within the playback duration). In another aspect, the audio signal may include the entire playback duration of the audio content, but the content player may begin playback starting at or after the playback stop time. Thus, playback of the audio content is handed off to the audio system 20 (e.g., the audio output device), and is synchronized with the audio system 1 such that content continues to play as if to transition playback from the audio system 1 to the audio system 20.

In one aspect, the content player 29 performs one or more audio signal processing operations. In some aspects, the player may apply one or more audio effects upon the audio signal. For instance, the player may apply an audio transition effect upon the audio signal upon continuing to output the audio content. As an example the player may apply a fade-in audio transition effect upon a beginning portion of the audio signal by increasing the sound output level of the speaker 23 to a preferred user level. In particular, the player may adjust a direct-to-reverberant ratio of the audio signal as a function of playback time for a period of time. Fading in the audio content which may be more preferable rather than abruptly outputting the audio content at the preferred user level. In another aspect, the content player may apply other audio processing operations, such as equalization operations and spectral shaping operations.

In one aspect, the controller 25 may optionally include the playlist generator 28 that is configured generate a playlist based on the identified audio content. Specifically, the generator generates the playlist that has audio content related to the identified audio content for playback by the audio system 20. For instance, the generator receives identification information from the audio content identifier and uses the information to generate the playlist. In one aspect, the generator may use the information to perform a table lookup into a data structure that associates similar information with audio content. In some aspects, audio content that has at least one similarity (e.g., being of a same genre) as the identified audio content may be selected by the generator to be a part of the playlist. In one aspect, the playlist may be a data structure that includes identification information of selected audio content in a particular order. To illustrate, when the audio content is a (first) musical composition, the playlist generator may use information of the first musical composition to generate a list of several similar musical compositions (e.g., two or more musical compositions).

In one aspect, the related audio content listed within the playlist may have one or more similar (or same) characteristics as the identified audio content. For instance, when the audio content is a country musical composition, the playlist may include several country musical compositions. As another example, the playlist may be a playlist for a particular artist that includes several musical compositions by the particular artist, when they are identified to be the author (performer or singer) of the country musical composition. Thus, the playlist may be a list of similar (or related) musical compositions may be at least one of a same genre, a same musical artist, or belonging to a same album as the first musical composition.

In one aspect, the playlist generator may be informed by audio content that has been previously identified by the audio content identifier 26. Specifically, the generator may generate the playlist based on a playback history of the audio system 1. For example, the playlist generator may continuously (or periodically) retrieve identification information of audio content that is identified by the audio content identifier 26. As the identifier identifies different audio content, the playlist generator may receive the information and produce a (or update an existing) playback model based on one or more characteristics of the identified audio content. In one aspect, the playback model may be a data structure that indicates characteristics of audio content that have been identified the most. In one aspect, the playlist generator may have a model for different types of audio content. For example, the playlist generator may have a country music playback model that indicates what country musical compositions have been previously identified. Returning to the previous example, the country music playback model may indicate that a particular artist is a country musical artist that is mostly identified. Thus, upon identifying that the identification information for a current audio content is a country music genre, the playlist generator may generate a playlist using the country music model, which may have (e.g., primarily) musical compositions by the particular artist. In one aspect, each model may be updated over time.

In some aspects, the playlist generator may be informed by playback history of the content player. For instance, the content player 29 may be configured to retrieve audio content in response to user input, which may be received through the audio source device (e.g., via user touch input upon the touch-sensitive display screen). Specifically, the audio source device may display a graphical user interface (GUI) of the media player software application and select a song for playback. In one aspect, such user selections may be identified by the playlist generator to generate the playlist (e.g., playback model) based on playback history. In some aspects, the playlist generator may generate the playlist based on user preferences. For example, the playlist generator may access user accounts of media streaming platforms associated with the user to identify characteristics of audio content that the user prefers to listen to.

In one aspect, the playlist generator 28 may generate a playlist for each identified audio content. In some aspects, once the audio system 1 has ceased outputting the audio content, the playlist generator may transmit the generated playlist to the content player 29, which may use the playlist to continue outputting audio content after the remainder of the current audio content has finished. Specifically, the player may stream audio content listed within the generated playback list (e.g., in a consecutive order) once the remainder is finished being output via the speaker. For instance, the content player 29 uses identification information of a (e.g., first) piece of audio content listed in the playlist to retrieve an associated audio signal (e.g., from local memory or from the server 24). As an example, when the audio content is a musical composition, and the playlist may be several (e.g., related) musical compositions which are streamed by the player once the musical composition is output by the speaker. In one aspect, the content player 29 will continue to playback the audio content in the playlist until user input is received to stop.

FIG. 3 shows a block diagram of the audio system that continues to output a radio broadcast program according to another aspect. As described herein, a "radio broadcast program" may include audio content that is broadcast by a radio broadcasting station. For instance, the program may be a particular segment (e.g., a block of programming) that is broadcast by the station. Examples of a radio broadcast program may include music, radio talk (or public) shows, news programs, etc. In one aspect, the radio broadcast programs may be broadcast in frequency modulation (FM) broadcasting or amplitude modulation (AM) broadcasting or associated digital services, a part of a broadcast channel.

As shown, this diagram illustrates operations performed by the controller 25 for streaming a radio broadcast program over a computer network. In one aspect, the controller 25 may perform at least some of the operations illustrated in this figure in response to determining that the audio content being played back by the audio system 1 is a radio broadcast program. Otherwise, the controller may perform operations as described in FIG. 2. More about determining which operations are performed is described herein.

As shown, the controller includes several different (and similar) operational blocks, as shown in FIG. 2. In particular, the controller 25 includes the audio stopped detector 27, a radio station classifier 31, a radio station lookup 32, a location identifier 33, and the content player 29.

In one aspect, the radio station classifier 31 is configured to determine whether audio content contained captured by the microphone 22 is a radio broadcast program that is being broadcast by a radio broadcasting station (and being picked up by the audio playback device (e.g., radio 1 of FIG. 1)). In one aspect, the classifier may perform similar operations as the audio content identifier to make this determination. In particular, the classifier may determine identification information (of the audio content) indicating that the audio content is (associated with) a radio broadcast program and a source of the audio content as a radio broadcasting station that is broadcasting the program. For example, the classifier may perform an acoustic signal analysis upon audio content of the microphone signal to determine identification information (of the audio content) indicating that the audio content is (associated with) a radio broadcast program that is being broadcast by a radio broadcasting station. For instance, the classifier may process the signal according to an audio recognition algorithm, such as a speech recognition algorithm to detect speech (as identification information) contained therein indicating that the audio content is a radio broadcast program. To determine whether the audio content is a radio broadcast program, the classifier may determine whether the audio content contains speech (words or phrases) that are associated with a radio broadcast. For example, in the United States, the Federal Communications Commission (FCC) requires that radio stations air their radio station call signs, which are multiple letters (e.g., usually three to four letters) that uniquely identify a radio station as close to the top of each hour as possible. Thus, the radio station classifier may determine whether speech contained within the audio content includes a radio station call sign. In particular, the classifier may use speech to perform a table lookup into a data structure that includes (e.g., known) call signs. If a call sign is identified, the audio content is determined to be a radio broadcast program and the source of the program being a radio broadcasting station with the identified call signs.

In another aspect, the radio station classifier 31 may determine whether the audio content is a radio broadcast program based on identification information (e.g., call signs) that may be displayed on a display of the vehicle audio system. Most FM radio broadcasts include Radio Data System (RDS) information that is embedded into the FM signal. This identification information may include time, station information (e.g., the radio station call sign), and program information (e.g., information relating to the radio broadcast program that is being broadcasted), etc. When tuned to a station, the vehicle audio system receives the stations RDS information and displays the information on its display. In one aspect, the classifier may determine the identification information by receiving image data captured by the camera 21 of the display, and performing an object recognition algorithm upon the image data to identify at least some of the displayed identification information to be used to determine whether the audio content is a radio broadcast program (e.g., whether the image data includes a radio station call sign, etc.).

In another aspect, the RDS information may be obtained via other methods. For example, the vehicle audio system may transmit the data to the controller 25 (e.g., via any wireless protocol, such as BLUETOOTH protocol).

In another aspect, the radio station classifier 31 may be configured to determine whether the audio content is a radio broadcast program based on past acoustic analysis. For instance, the classifier may compare spectral content of the microphone signal with previously captured spectral content that is associated with a particular radio broadcast program. For example, the vehicle audio system may playback a same radio broadcast program each day (e.g., during a morning commute). During a previous acoustic analysis, the classifier may have identified the radio broadcast station associated with the radio program, and stored the spectral content of the microphone and the information (e.g., as a data structure) for later comparison.

In one aspect, the controller 25 may confirm the validity of at least some of the determined identification information. Call signs may consist of several (e.g., two, three, four, etc.) letters. In some cases, radio broadcasting stations may share at least one common letter with another station. For example, a first station may have a four-letter call sign, while a second, different station may have a three-letter call sign that may include all (or some) of the first station's letters. To prevent erroneous classification (e.g., classifying the first station as the second station, which may result when the last letter of the four-letter call sign is not recognized by the speech recognition algorithm), the controller 25 is configured to confirm (e.g., with a high level of certainty) the identified radio broadcast station based on (at least some of) the identification information (e.g., identified radio station call signs) and additional information, such as location information. Specifically, the location identifier 33 is configured to identity the location of controller 25 (e.g., or more particularly the location of the source device 2 when the controller is a part of the device). For example, the location identifier may be an electronic component, such as a GPS component that is configured to determine location information as coordinates. The radio station lookup 32 is configured to receive the location information and receive determined identification information (e.g., an identified radio station call sign), and is configured to identify (or confirm) the radio broadcasting station that is broadcasting the radio broadcast program based on the determined identification information and the location information. For instance, the station lookup may include a data structure that includes a list of broadcasting radio stations, their call signs, and their location. The station lookup may perform a table lookup using the location information and the radio station call sign into the data structure to identify a radio station with matching characteristics. Thus, returning to the previous example, the first station may be located in one city (e.g., Los Angeles, Calif.), and the second station may be located in a different city (e.g., Denver, Colo.). Upon determining that the location information indicates that the device is in (or around) Los Angeles, the radio station lookup 32 may select the first station since three of four letters of the call sign were identified and the station is located in Los Angeles. In one aspect, the radio station lookup may (e.g., periodically) update the data structure via the server 24.

In one aspect, one radio station may be associated with one or more call signs. In this case, the station may broadcast in several different locations, each location having a unique call sign. As a result, the data structure used by the radio station lookup 32 may associate each station with one or several call signs used by the station to broadcast radio programs.

In one aspect, upon identifying (e.g., confirming) the radio station, the station lookup 32 may determine streaming data of the radio broadcast program. For instance, most (if not all) radio broadcasting stations stream radio broadcasting programs (e.g., in real-time). Thus, upon identifying the station, the lookup may determine streaming data, such as a streaming uniform resource locator (URL) associated with the radio program. In particular, the data structure of the station lookup may include the streaming data. Thus, the station lookup may perform a table lookup upon the data structure using at least some identification information associated with the radio station (e.g., radio station call sign) to determine the URL. In another aspect, the station lookup may retrieve the data from the server 24. Upon identifying the streaming data, the content player 29 may use the data (e.g., accessing the URL) to continue output of the audio content by streaming the radio broadcast program that is being broadcast by the radio broadcasting station over a computer network.

In one aspect, the controller may be configured to stream similar (or related) audio content that is being broadcast by the radio broadcasting station over the computer network, rather than stream the radio broadcast program. In one aspect, similar audio content may include audio content that has at least one similar characteristic, such as being of a same genre, a same author, etc. In some aspects, the radio station lookup 32 may be configured to identify a similar radio broadcast program to the program that was identified by the classifier, and stream the similar program. This may be the case when the lookup is unable to find streaming data of the identified radio broadcast program. In this case, the lookup may determine characteristics of the identified radio program (e.g., type of content, such as talk radio or genre of music), and identify a similar program for streaming (e.g., by performing a table lookup, as described herein).

In one aspect, the (e.g., controller 25 of the) audio system may perform the operations described in either FIG. 2 or FIG. 3 based on a confidence score. Specifically, the controller may first perform at least some of the operations of FIG. 3, and may then perform operations of FIG. 2 upon a confidence score being below a threshold. In one aspect, the confidence score may be based on whether the audio system may determine (e.g., within a certainty) that the audio content being played back by the audio playback device is a radio broadcast program. In this case, the radio station classifier 31 may monitor the microphone signal to identify characteristics of a radio broadcast program, such as identifying a call sign, as described herein. In one aspect, the confidence score may be based on a number of characteristics the classifier is able to identify (e.g., the call sign, the type of audio content, etc.) In one aspect, the classifier may perform these operations for a period of time (e.g., one minute). If, however the classifier is unable to identify (e.g., at least one) the characteristics or the confidence score is below the threshold, the controller 25 may then begin performing the operations described in FIG. 2 (e.g., the audio content identifier 26 may begin determining identification information of the audio content). In another aspect, the audio system may perform the operations based on a user preference.

The operations described thus far are (at least partially) performed by the controller 25 of the audio system 20. In one aspect, at least some operations may be performed by one or more servers 24 that are communicatively coupled with the controller 25 (or more specifically with the audio source device 2 and/or the audio output device 3). For example, the server 24 may perform the operations of the audio content identifier 26 to determine the identification information. Once determined, the server 24 may transmit the identification information to the (e.g., controller 25 of the) identifier 26 (e.g., via a computer network). In another aspect, the server 24 may perform additional operations. The following flowcharts include at least some of the operations described herein performed by the server.

Figure 4:
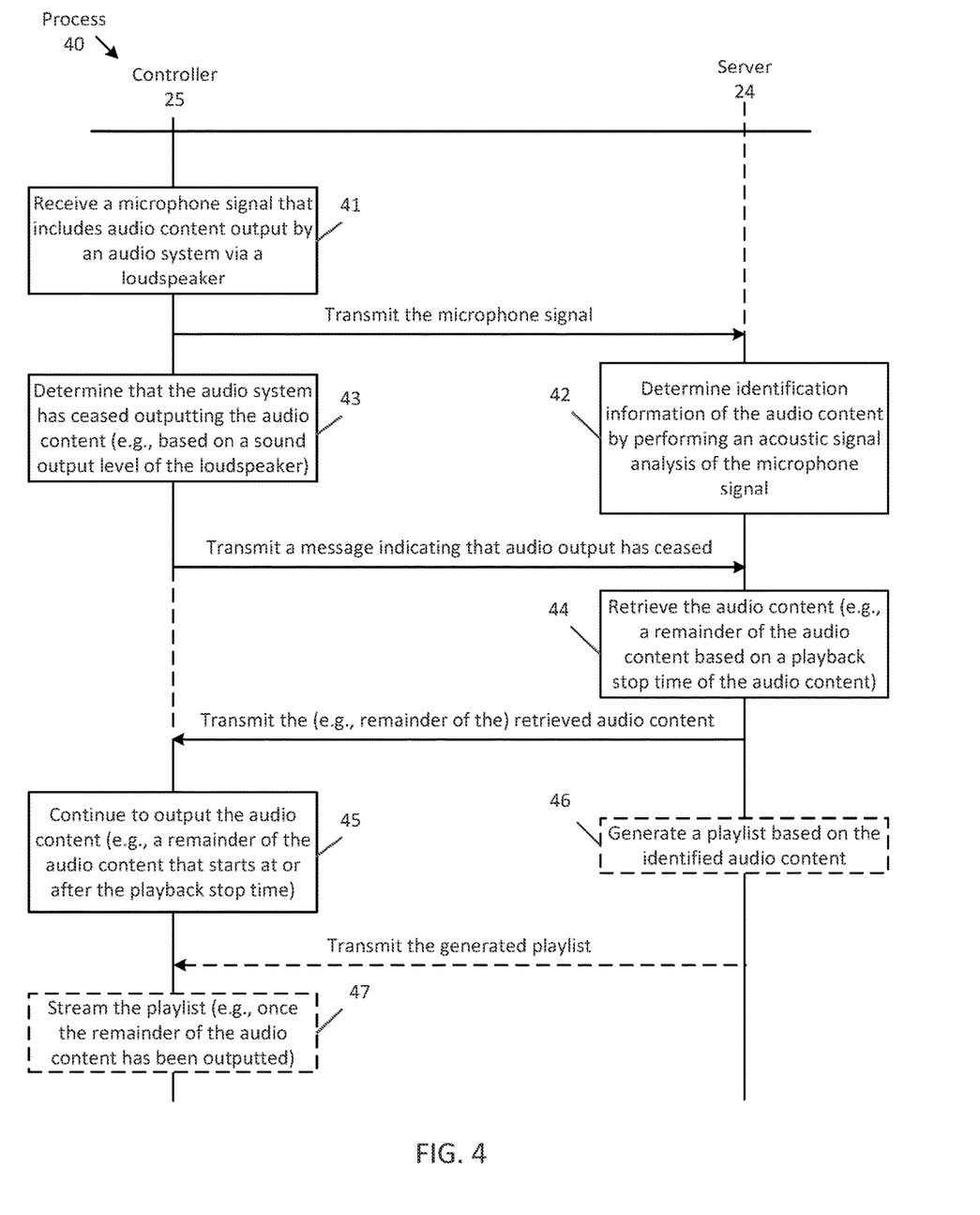
FIG. 4 is a flowchart of one aspect of a process performed by a controller and a server for continuing to output audio content.

FIG. 4 is a flowchart of one aspect of a process 40 performed by controller 25 and server 24 for continuing to output audio content. Specifically, this figure illustrates a process 40 in which at least some of the operations described in relation to FIG. 2 are performed by the controller and the server.

The process 50 begins by the controller receiving a microphone signal that includes audio content output by an audio system (e.g., system 1 illustrated in FIGS. 1-3) via a loudspeaker (at block 41). The controller transmits the microphone signal to the server 24 (e.g., via a computer network). In one aspect, the controller may transmit at least a portion of audio data (e.g., spectral content) associated with the microphone signal. The server 24 determines identification information of the audio content by performing an acoustic signal analysis of the microphone signal (at block 42). Specifically, the server may perform the operations of the audio content identifier 26 to determine the identification information (e.g., a description of the audio content, an author of the audio content, etc.). The controller 25 determines that the audio system has ceased outputting the audio content (at block 43). For instance, the audio stopped detector 27 may determine that the system has turned off, due to a sound output level (as measured by the microphone signal) of the loudspeaker being below a threshold. In response, the controller may transmit a message indicating that the audio output has ceased. In one aspect, the message may include the timestamp that indicates a playback stop time of the audio content (e.g., within the playback duration of the audio content). The server retrieves (e.g., an audio signal that corresponds to) the audio content (at block 44). Specifically, the server may perform the operations of the content player by using the identification information and the timestamp to retrieve the audio signal. In particular, the audio signal may be a remainder of the audio signal based on the playback stop time indicated by the timestamp.

The server 24 transmits (or streams) the (e.g., remainder of the) retrieved audio content to the controller 25. The controller 25 receives (e.g., an audio signal that corresponds to) the audio content and continues to output the audio content (at block 45). Specifically, the controller synchronizes the continued output of the audio content with the paused output by the audio system 1 by outputting a remainder of the audio content that starts at or after the playback stop time. In one aspect, to continue output the controller drives speaker 23 (which is not part of the audio playback device) using the received audio signal, as described herein. In one aspect, the controller 25 may apply an audio transition effect, as described herein.

In addition, the server 24 may generate a playlist based on the identified audio content (at block 46). For instance, the server may perform the operations of the playlist generator 28 by using the identification information to generate a playlist of similar (related) audio content. For instance, when the audio content is a musical composition, the playlist may include (e.g., identification information of) several musical compositions that are each similar to the (original) musical composition (e.g., being of the same genre). The controller 25 streams the playlist, e.g., once the remainder of the audio content has finished being output by the speaker 23 (at block 47). For instance, the playlist may stream (using the identification information of) each of the pieces of audio content listed in the playlist in a consecutive order.

Figure 5:
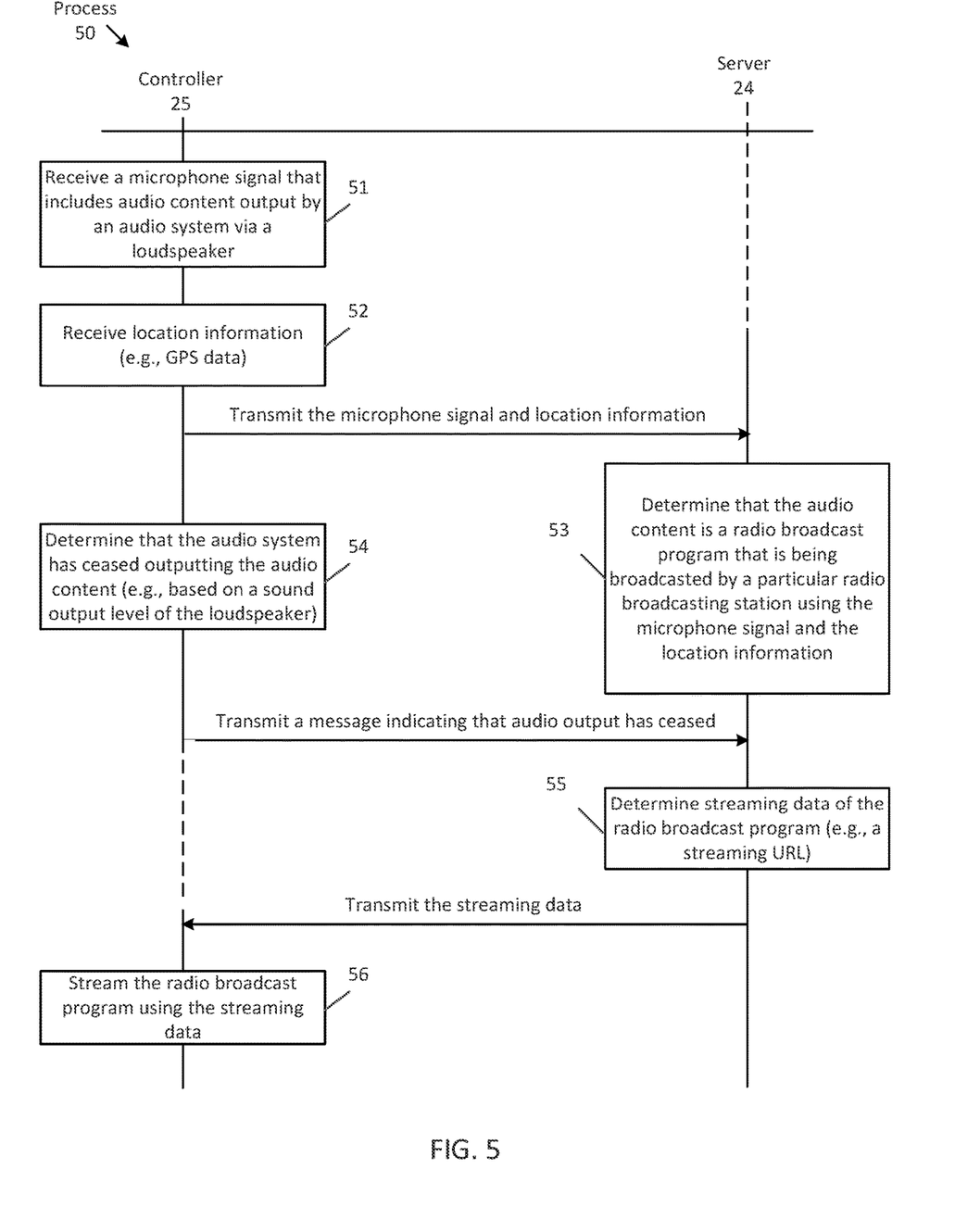
FIG. 5 is a flowchart of one aspect of a process performed by the controller and the server for continuing to output a radio broadcast program.

FIG. 5 is a flowchart of one aspect of a process 50 performed by the controller 25 and the server 24 for continuing to output a radio broadcast program. In particular, this figure illustrates process 50 in which at least some of the operations described in relation to FIG. 2 are performed by the controller and the server.

The process 50 begins by the controller 25 receiving a microphone signal that includes audio content output by an audio system 1 via a loudspeaker (at block 51). The controller receives location information, such as GPS data (at block 52). For instance, the location identifier may provide location information that indicates the location of either (or both of) the audio source device 2 or the audio output device 3. The controller transmits the microphone signal and the location information to the server.

The server 24 determines that the audio content is a radio broadcast program that is being broadcast by a particular radio broadcasting station using the microphone signal and the location information (at block 53). At this stage, the server may perform the operations performed by the radio station classifier 31 and/or the radio station lookup 32, as described herein. For instance, the server may determine identification information of audio content that is being output by the audio system through acoustic signal analysis of the output audio content. The controller 25 determines that the audio system 1 has ceased outputting the audio content (at block 54). For instance, the audio stopped detector 27 may determine that the SPL of the microphone signal is below a SPL threshold, as described herein. The controller transmits a message to the server indicating that the audio output has ceased. The server determines streaming data of the radio broadcast program, such as a streaming URL (at block 55). For instance, the server may perform a table lookup using identification information associated with the radio broadcast program and/or the radio broadcasting station into a data structure that associates identification information with streaming data. The server transmits the streaming data to the controller. The controller streams the radio broadcast program using the streaming data (at block 56).

Some aspects may perform variations to the processes 40 and 50 described in FIGS. 4 and 5. For example, the specific operations of at least some of the processes may not be performed in the exact order shown and described. The specific operations may not be performed in one continuous series of operations and different specific operations may be performed in different aspects. For example, the generation (and transmission) of the playlist at block 46 may be performed contemporaneously with the retrieval of the audio content at block 44. Thus, the generated playlist may be transmitted with the retrieved audio content to the controller 25. In another aspect, the server may not retrieve the audio content as described in block 44. Instead, the server may transmit identification information of the identified audio content (along with the timestamp) to the controller 25, which may use the information to retrieve the audio content (e.g., from local or remote memory). As another example, rather than transmitting the streaming data in process 50, the server may retrieve the stream of the radio broadcast program and transmit the stream to the controller 25 for output.

As described herein, the controller 25 continues the output of the audio content (e.g., at blocks 45 and 56 in processes 40 and 50, respectively). In one aspect, these operations may be performed automatically. For instance, the controller may continue outputting the audio content in response to receiving the audio content from the server 24. In another aspect, the controller 25 may continue outputting the audio content in response to receiving authorization from the user. Specifically, the controller 25 may provide a notification that includes a request for continuing the output of the audio content (e.g., via the speaker). For example, the controller may display a pop-up notification on a display screen of the audio source device, which includes a GUI item for authorization (or denying) the continuance of audio playback. In one aspect, in response to receiving user authorization (e.g., in response to receiving a user-selection of the GUI item via the touch-sensitive display screen), the controller 25 may proceed to playback the audio content (e.g., by driving the speaker 23 with the audio signal).

In one aspect, at least some of the operations described herein (e.g., processes 40 and/or 50) may be performed by a machine learning algorithm that is configured to seamlessly synchronize and hand-off media to a non-ecosystem device. For instance, to generate the playlist, the playlist generator may perform a machine learning algorithm to determine an optimal playlist to follow a piece of audio content that is identified by the audio content identifier 26.

In one aspect, at least some of the operations described herein are operational operations that may or may not be performed. Specifically, blocks that are illustrated as having dashed or dotted boundaries may optionally be performed. For example, the operations performed by the playlist generator 28 in FIG. 2, may be optional such that the audio system 20 may only output the remainder of the audio content. Once finished, the audio system may prompt the user (e.g., via an audible alert) requesting whether the user wishes to continue listening to (e.g., similar) audio content. In addition, at least some of the operational blocks in FIGS. 2 and 3 are communicatively coupled to the server via dashed lines. In one aspect, each of these operational blocks may optionally communicate with the server in order to perform one or more operations. For instance, the radio station lookup 32 in FIG. 3 may (e.g., periodically) retrieve a (e.g., updated) list of broadcasting radio stations, their call signs, and their locations. In another aspect, however, the radio station lookup may retrieve the list from local memory.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by an electronic device, the method comprising:
   identifying audio content captured by a microphone of the electronic device, the audio content output by an audio playback device via a loudspeaker; and
   in response to determining that the audio playback device has ceased outputting the audio content,
   retrieving an audio signal that corresponds to the audio content; and
   driving a speaker that is not part of the audio playback device using the audio signal to continue outputting the audio content.

2. The method of claim 1, wherein the audio content is a musical composition having a playback duration, wherein the audio playback device ceases to output the musical composition at a moment within the playback duration, wherein the retrieved audio signal comprises a remainder of the musical composition that begins at or after the moment within the playback duration.

3. The method of claim 2 further comprising:
   streaming each of a plurality of musical compositions of a playlist in a consecutive order once the remainder of the musical composition is output via the speaker,
   wherein each of the plurality of musical compositions of the playlist is related to the musical composition.

4. The method of claim 3, wherein each of the plurality of musical compositions of the playlist is related to the musical composition as being at least one of a same genre, a same musical artist, or belonging to a same album as the musical composition.

5. The method of claim 1 further comprising providing a notification that includes a request for continuing the output of the audio content via the speaker, wherein driving the speaker using the audio signal is in response to receiving a user authorization.

6. The method of claim 1 further comprising determining that the audio playback device has ceased outputting the audio content based on a sound output level of the loudspeaker being below a threshold.

7. The method of claim 1, wherein the audio playback device is a part of a vehicle audio system of a vehicle, wherein the method further comprises determining that the audio playback device has ceased outputting audio content by determining at least one of the vehicle has stopped or an engine of the vehicle has been shut off.

8. The method of claim 1, wherein identifying the audio content captured by the microphone comprises:
   performing an acoustic signal analysis upon the microphone signal to determine identification information of the audio content; or
   receiving the identification information from a remote device that is not part of the audio playback device and had performed the acoustic signal analysis upon the microphone signal.

9. The method of claim 1, wherein the electronic device is not communicatively coupled to the audio playback device.

10. A method performed by an electronic device, the method comprising:
    identifying audio content that is being output by an audio playback device based on an, acoustic signal analysis of the audio content; and
    in response to determining that the audio playback device has ceased outputting the audio content, continuing to output the audio content via a speaker.

11. The method of claim 10 further comprising receiving a microphone signal captured by a microphone of the electronic device, wherein the microphone signal includes the audio content output by the audio playback device, wherein the acoustic signal analysis is of the microphone signal.

12. The method of claim 10, wherein identifying the audio content comprises determining identification information of the audio content, wherein the identification information indicates that the audio content is a radio broadcast program that is being picked up by the audio playback device and indicates a source of the audio content as a radio broadcasting station that is broadcasting the radio broadcast program.

13. The method of claim 12 further comprising:
    receiving location information of the electronic device; and
    confirming that the source of the audio content is the radio broadcasting station using the identification information and the location information.

14. The method of claim 13, wherein continuing to output the audio content comprises streaming the radio broadcast program over a computer network.

15. The method of claim 10, wherein continuing to output the audio content comprises streaming similar audio content that is being broadcast by a radio broadcasting station over a computer network.

16. The method of claim 10, wherein continuing to output the audio content comprises
    retrieving, from local memory of the electronic device or a remote device, an audio signal that corresponds to the audio content; and
    driving the speaker using the audio signal.

17. The method of claim 16, wherein the audio content has a playback duration, wherein the audio playback device ceases to output the audio content at a moment within the playback duration, wherein the retrieved audio signal comprises a remainder of the audio content that begins at or after the moment within the playback duration.

18. The method of claim 10, wherein the audio content is a musical composition, wherein the method further comprises:
    streaming each of a plurality of musical compositions of a playlist in a consecutive order once the musical composition has finished being output by the audio playback device,
    wherein each of the plurality of musical compositions of the playlist is related to the musical composition.

19. The method of claim 18, wherein each of the plurality of musical compositions of the playlist is related to the musical composition as being at least one of a same genre, a same musical artist, or belonging to a same album as the musical composition.

20. A audio system comprising
    a processor; and
    memory having instructions which when executed by the processor causes the audio system to
      receive a microphone signal that includes audio content output by an audio playback device via a loudspeaker;
      perform an acoustic signal analysis upon the microphone signal to identify the audio content; and
      in response to determining that the audio playback device has ceased outputting the audio content, continue to output the audio content via a speaker.

21. The audio system of claim 20, wherein the instructions to perform the acoustic signal analysis comprises instructions to:
    process the microphone signal according to a speech recognition algorithm to detect speech contained therein; and
    determine that the audio content is a radio broadcast program based on the speech.

22. The audio system of claim 21, wherein the instructions to determine that the audio content is a radio broadcast program comprises instructions to determine that the speech includes a radio station call sign.

23. The audio system of claim 22, wherein the speaker is a part of an electronic device, wherein the memory has further instructions to:
    receive location information of the electronic device; and
    identify a radio broadcasting station that is broadcasting the radio broadcast program based on the radio station call sign and the location information.

24. The audio system of claim 23, wherein the instructions to continue to output the audio content comprises instructions to stream the radio broadcast program that is being broadcast by the radio broadcasting station over a computer network.

25. The audio system of claim 23, wherein the instructions to continue to output the audio content comprises instructions to stream similar audio content to the radio broadcast program over a computer network.

26. The audio system of claim 20, wherein the audio content is a musical composition, wherein the memory has further instructions to:
- generate a playlist of a plurality of musical compositions that are each at least one of a same genre, a same musical artist, or belonging to a same album as the musical composition; and
- stream each of the plurality of musical compositions in a consecutive order once the musical composition has finished being output.

* * * * *